Sept. 8, 1942.                     A. E. JURS                         2,295,218
                           LIQUID INDICATOR APPARATUS
                              Filed April 9, 1940                4 Sheets-Sheet 4
FIG_5_
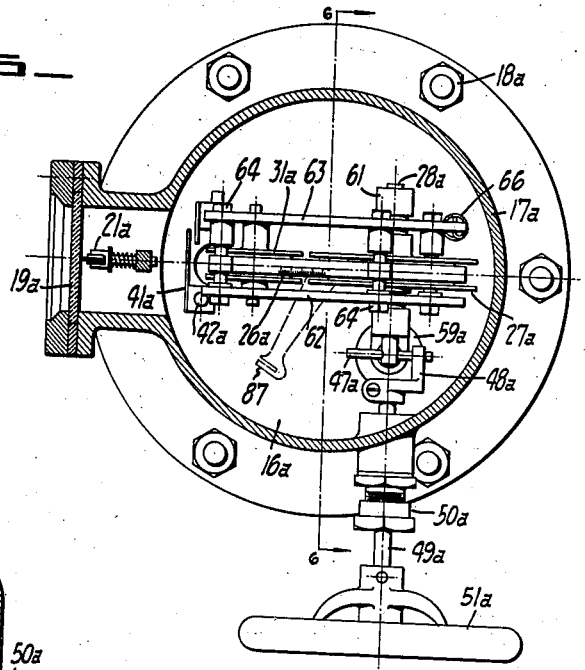
FIG_6_
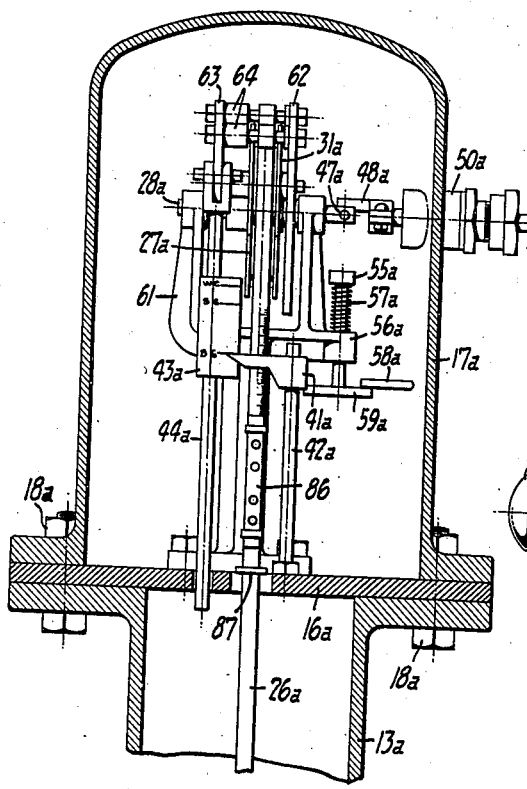
FIG_7_
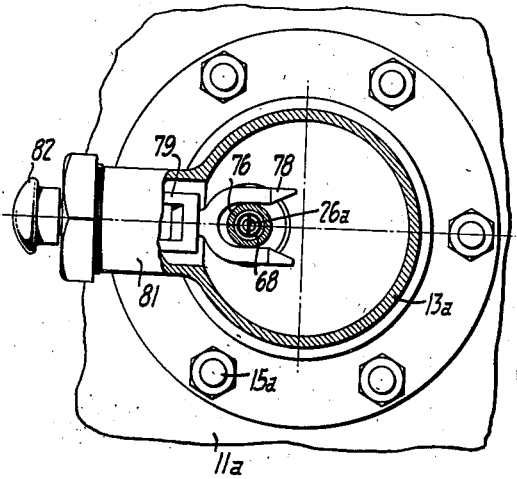
INVENTOR
Albert E. Jurs
BY
ATTORNEY Patented Sept. 8, 1942

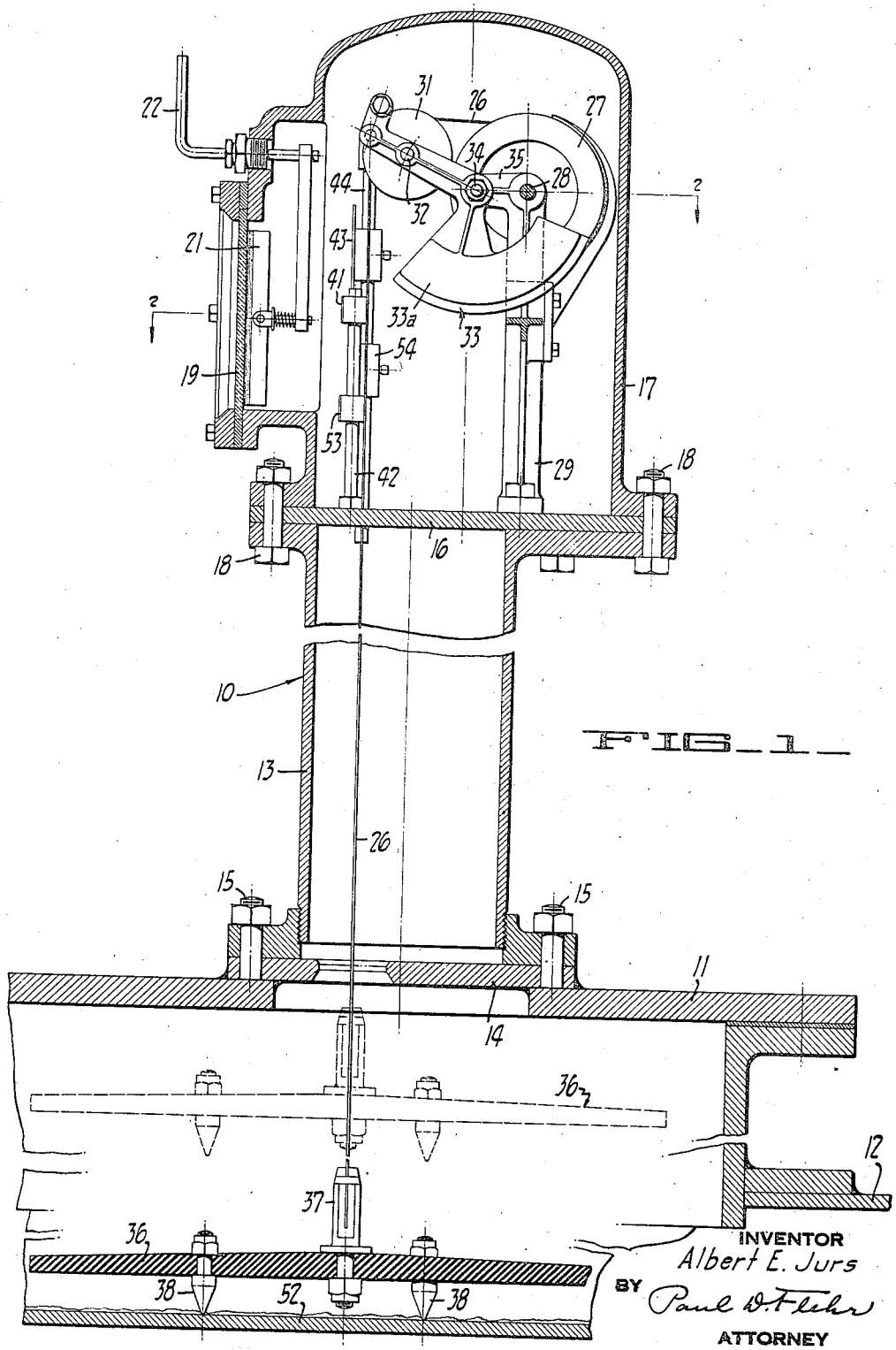
FIG_1_

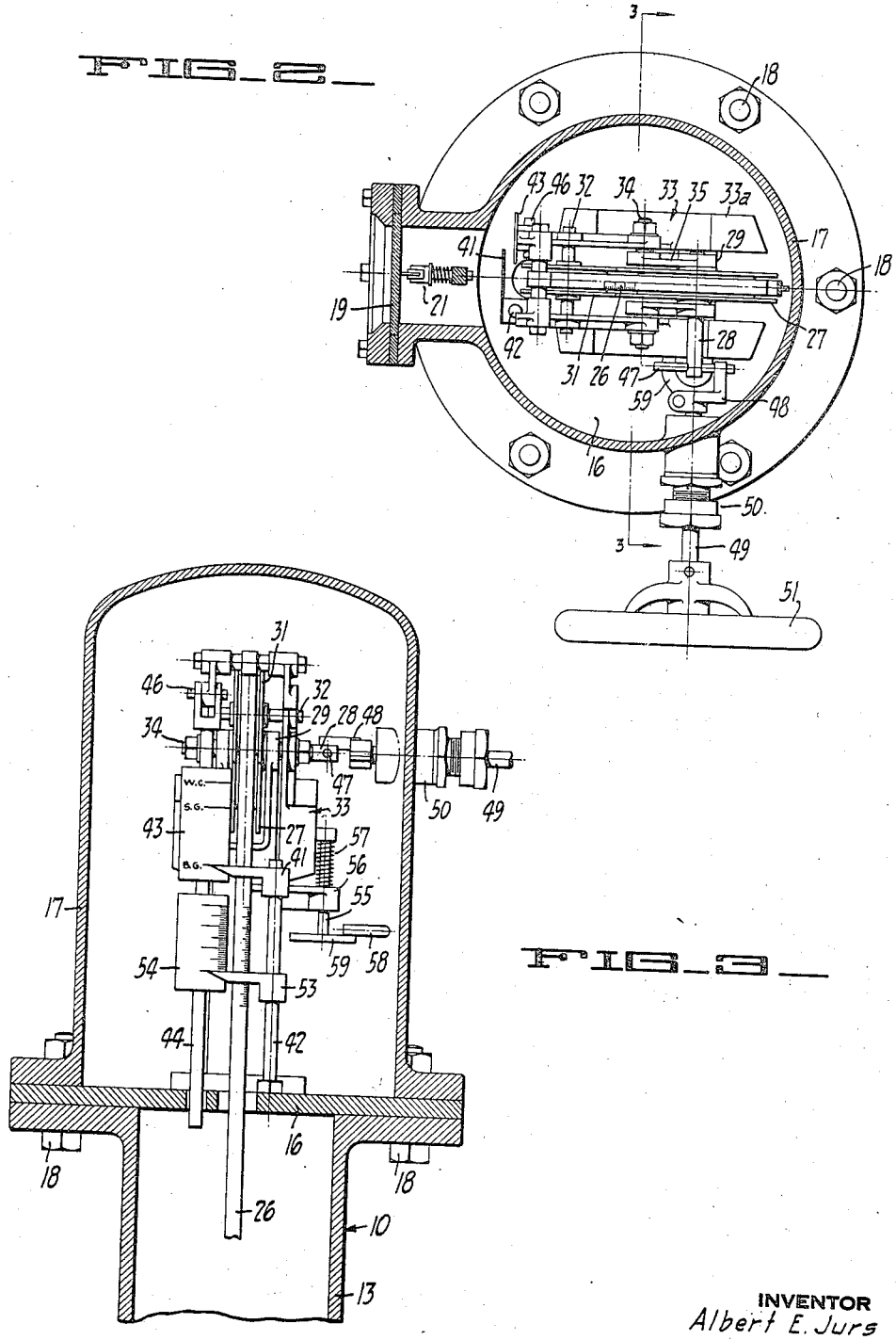

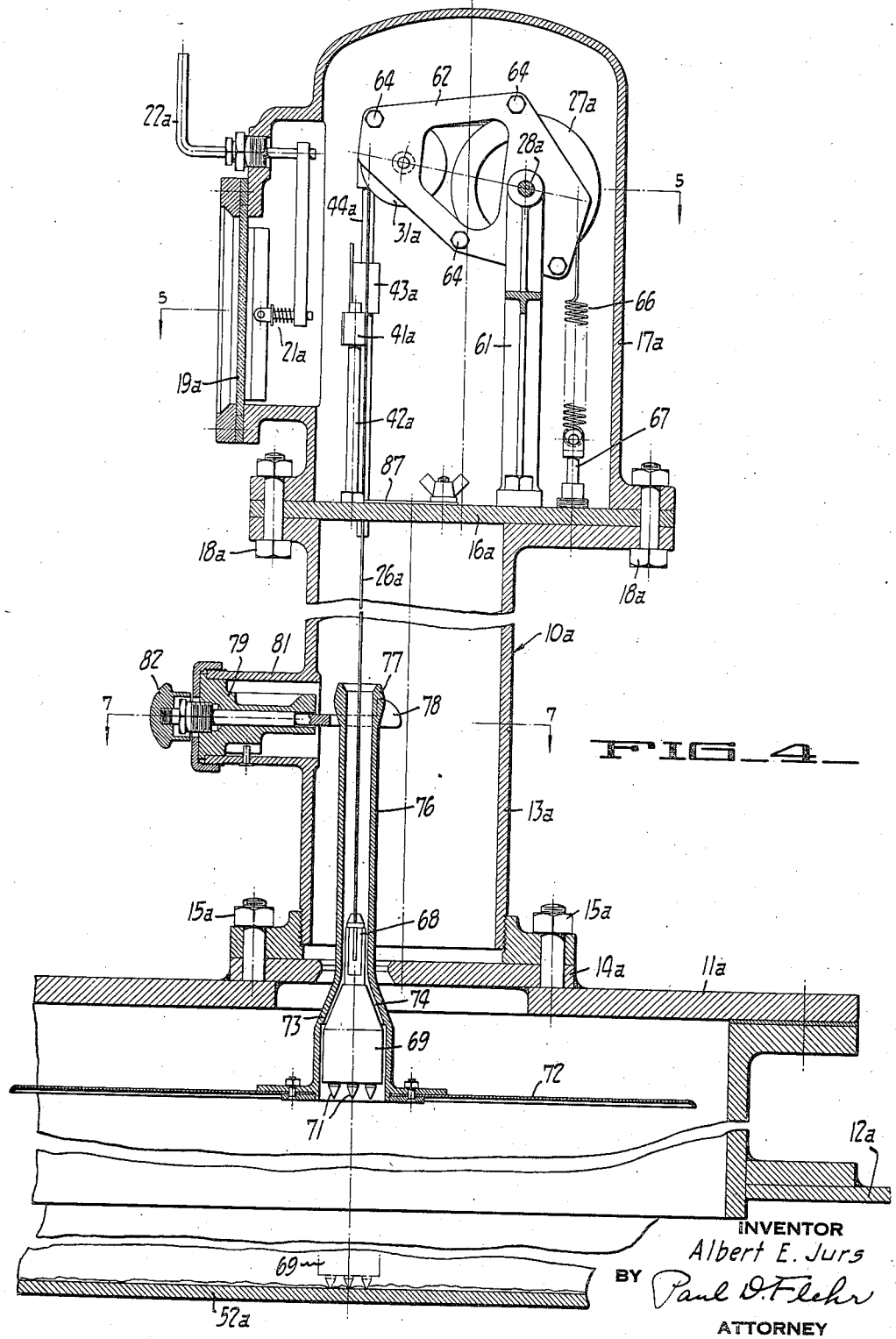

2,295,218

UNITED STATES PATENT OFFICE 2,295,218

LIQUID INDICATOR APPARATUS

Albert E. Jurs, Piedmont, Calif.

Application April 9, 1940, Serial No. 328,665

7 Claims. (Cl. 33—126.7)

This invention relates generally to liquid indicator apparatus for gauging the amount of liquid in a liquid storage tank, and more particularly to apparatus of the above character for use with storage tanks where the interior of the tank must remain sealed with respect to the atmosphere, as for example tanks containing volatile petroleum products.

In large storage tanks of the type commonly employed for storing hydrocarbon products, there is considerable variation from time to time in the distance between the top and bottom walls of the tank. As a result, if the liquid level is gauged by an ordinary level indicator, substantial errors occur so that the readings obtained are not reliable.

The present invention has for its general object the provision of a liquid level indicating means which is accurate irrespective of variations in the distance between the top and bottom walls of the tank.

Another object of the invention is to provide an indicator of the type referred to which can be employed without opening the tank.

Another object of the invention is to provide indicating apparatus which is both sensitive and easy to operate to enable the obtaining of accurate readings in a short time.

Another object of the invention is to provide indicating apparatus of the character referred to wherein the apparatus can be checked for accuracy when each reading is taken.

Another object of the invention is to provide indicating apparatus of the character referred to which can be employed in obtaining the density of the storage liquid.

Other objects and advantages of the invention will appear from the following description of certain preferred embodiments of the invention, as illustrated in the accompanying drawings, in which:

Figure 1 is a vertical cross sectional view of liquid indicator apparatus embodying the invention, the apparatus being shown as conditioned for gauging the bottom wall of the tank.

Figure 2 is a sectional plan view of the apparatus shown in Figure 1, the view being taken in a plane indicated by the line 2—2 in Figure 1;

Figure 3 is a sectional elevation of the apparatus taken in a plane indicated by the line 3—3 in Figure 2;

Figure 4 is a vertical cross section of a modified form of apparatus embodying the invention;

Figure 5 is a sectional plan view taken in a plane indicated by the line 5—5 in Figure 4;

Figure 6 is a sectional elevational view of the apparatus taken as indicated by the line 6—6 in Figure 5; and Figure 7 is a horizontal sectional view taken as indicated by the line 7—7 in Figure 4.

Referring to Figures 1 to 3, the apparatus illustrated consists of the casing 10 adapted to be mounted upon the top wall 11 of a liquid storage tank 12. The casing 10 may include a lower tubular part 13 which is mounted on the wall 11 of the tank by means of spacing plate 14 and suitable fastening studs 15. At its upper end, the lower casing part 13 carries a supporting plate 16 to which a cover 17 is secured by suitable fastening bolts 18. The various parts of the casing 10 are suitably clamped together by the studs 15 and bolts 18 to provide a vapor tight seal with respect to the surrounding atmosphere. The cover 17 is provided with a sight window 19 through which the operator may view the indicating elements. The window 19 can be provided with an inner wiper 21 operated by an exterior lever 22.

Within the casing 10 is mounted an elongated gauging element of variable effective length which can be employed to gauge the distance between the top surface of the liquid and the bottom of the tank, by applying selective gravity pulls to a weighing beam which cooperates with other indicating means to place a predetermined tension on the elongated element in taking the various readings. The gauging element includes a flexible metallic tape or ribbon 26 which has one end wound about a reel 27. Reel 27 is secured on a shaft 28 journaled in the forked upper end of a standard 29, mounted on the supporting plate 16. Adjacent the reel 27, the tape 26 extends over a sheave 31 journaled by pin 32 in the spaced-apart similar lever arms 33 forming a weighing beam. Each lever arm 33 is pivotally mounted at 34 on arm 35 of the standard 29, and the two lever arms 33 are suitably connected for movement as a unit. From the sheave 31, the tape 26 extends downwardly through the plates 16 and 14 into the tank, and at its lower end carries a disc-like body 36 providing a combined bottom and surface gauge. Thus, body 36 and tape 26 provide means for applying gravity pulls through sheave 31 to the weighing beam 33 to effect rocking thereof about its pivotal axis 34 and to cause raising and lowering of the weighted end 33a thereof. The body 36 may be formed as a disc suitably secured to the bottom of the tape 26, as by a connection 37, and having three or more tapered pins 38 secured in the lower surface thereof in symmetrical relation to its central axis. Preferably, the bottom surface of the disc 36 may be flat, while the upper surface is tapered to drain liquid. The disc 36 may be made of some suitable material such as "Bakelite" providing the proper density for the gauging operation, as will be described hereinafter.

As seen most clearly in Figure 3, the gauging tape 26 may be provided with suitable graduations or indicia for reading with respect to a pointer or index 41 adjustably mounted on the rod 42 carried by the supporting plate 16. Also, the pointer 41 has its end operatively related to an indicator plate 43 suitably secured on a vertically disposed rod 44 having its lower end slidably engaged in, and guided by, the supporting plate 16. The upper end of rod 44 is pivotally connected by a pin 46 to one lever arm 33 of the weighing beam. It will be understood that the weighing beam 33 will be moved to elevate its weighted arm 33a in response to the suspension of heavier weights by tape 26 so that with increased weights indicator plate 43 is lowered with reference to the pointer 41.

The indicator plate 43 carries calibrated gauge marks as indicated at BG, SG, and WC. The gauge marks are so disposed that a predetermined tension will be placed on the tape 26 when the disc 36 is at the bottom gauge point, at the surface gauge point, or suspended in the vapor above the liquid in the tank, and the indicator plate 43 is positioned so that the pointer 41 is opposite the respective gauge marks.

In order to control reeling and unreeling of the tape 26, and also to place the tension on such tape, the shaft 28 (Figure 2) is provided with a transverse pin 47 adapted for engagement by a crank 48 on a shaft 49 which projects through a stuffing box 50 in the cover 17, and is provided with a hand wheel 51.

To prevent unwinding of tape 26 from reel 27 when cover 17 is removed for inspection or repair of the apparatus, a normally disabled stop is provided in the form of a plunger 55 (Figure 3) mounted for vertical movement in boss 56 of bracket 29. Plunger 55 is urged upwardly by spring 57 but is normally restrained by inwardly projecting pin 58 on cover 17 which engages enlarged head 59 of the plunger and holds the upper end of the plunger out of the path of pin 47. When cover 17 is removed, the upper end of plunger 55 is moved into the path of pin 47 to prevent rotation of shaft 28 and unwinding of the tape 26.

In operation, the reel 27 is rotated by the hand wheel 51 to unwind the tape 26 and lower the gauge disc 36 until it rests on a suitable flat gauging surface such as a special plate or the bottom wall of the tank. The tapered pins 38 serve to penetrate any layer of slime or sediment, so that the disc 36 will always be supported on the gauging surface itself. The hand wheel 51 is then operated to reel in the tape 26 to place tension thereon without lifting it from the bottom so that the pointer 41 is moved into alignment with the bottom gauge mark BG on the plate 43. The operator then reads the tape across the pointer 41 to obtain the distance from the pointer to the bottom gauge surface of the tank.

The next operation is to reel in the tape 26 to lift the gauge disc 36 until it is only partly submerged in the top surface of the liquid, this point being indicated to the operator by a slight vibration transmitted through the tape 26 as the disc 36 breaks the surface of the liquid. The operator then adjusts the tension on the tape 26 until the pointer 41 is opposite the surface gauge mark SG on the plate 43, when the required predetermined tension is placed on the tape 26. At this point another reading can be taken on the graduations of the tape opposite the pointer 41. The difference in this reading and the prior reading will give the depth of liquid in the tank to enable calculation of the volume. The SG and BG marks on the plate 43 are pre-calibrated to vary the respective predetermined tensions employed therewith to adjust for the different positions of the ends of pins 38 and the disc 36 with respect to the tape 26. In this way correct bottom surface readings can be obtained with the same tape and pointer.

In order to check the apparatus and make certain that everything is in proper working order, the operator then rotates the reel 27 to wind in the tape until the gauge disc 36 is suspended in the vapor above the liquid, when the entire weight of the disc is supported by the tape 26. If at this time the weight control mark WC on the indicator plate 43 is opposite the pointer 41, the operator knows that the apparatus is in proper working order and that he has obtained the proper reading.

The apparatus can also be used in obtaining density readings with respect to liquid in the tank, and for this purpose a second pointer 53 is provided on the rod 42 for cooperation with a second graduated indicator plate 54, carried by the rod 44. In using the apparatus for obtaining density readings, the tape 26 is first reeled out so that the disc 36 is supported in the liquid in the tank, and the reading of the pointer 53 against the scale 54 is taken. The tape 26 is then reeled in until the disc 36 is entirely supported in the vapor above the liquid in the tank, when a second reading is taken on the scale 54. The difference in these readings gives the weight of the displaced liquid when the disc 36 is immersed in the liquid and, therefore, affords a means of calculating the density of the liquid. It will be understood, of course, that if desired the scale on the indicator plate 54 could be applied to the plate 43 and only one pointer used.

Figures 4 to 7 illustrate a modified form of the invention which will be described in detail only insofar as it differs from the form of the invention shown in Figures 1 to 3. Referring to Figure 4, casing 10a of the apparatus includes a tube standard 13a mounted on the top wall 11a of the tank 12a in the manner described in connection with the preceding modification. A cover 17a is mounted on a supporting plate 16a carried by standard 13a. Mounted within the casing 10a to extend down into the tank is an elongated gauging element or tape 26a which at one end is wound on reel 27a secured on operating shaft 28a suitably journaled on standard 61. As seen in Figure 5, an operating hand wheel 51a is connected to operate the shaft 28a by crank 48a and pin 47a carried by the shaft 28a.

Pivoted on shaft 28a are the opposed lever arms 62 and 63 which are connected by a plurality of studs 64 to provide a weighing beam which carries sheave 31a over which the tape 26a is trained. The weighing beam is urged in a clockwise direction, as viewed in Figure 4, by a spring 66 which is tensioned between lever arm 63 of the weighing beam and a stud 67 carried by the supporting plate 16a. Spring 66, therefore, opposes the weight of the tape 26a and the gauging elements associated therewith.

At its lower end, the tape 26a is connected by a suitable connection 68 with a plumb bob or bottom gauging element 69 carrying tapered pins 71 at its lower end for engagement with a gauging surface such as the bottom wall 52a of the tank as indicated in dotted lines in Figure 4. Associated with the plumb bob 69 and the tape 26a is a surface tension disc 72 of conventional construction having a hub 73 formed to receive the plumb bob 69 as shown in Figure 4. The plumb bob 69 and the hub 73 may be provided with complementary tapered portions as at 74 to provide for lifting of the disc 72 with the plumb bob 69 but to permit free disengagement of the plumb bob 69 therefrom for separate operation. The hub 73 has a tubular extension 76 having an enlarged upper end 77 for engagement by holding fork 78 which is slidably mounted in a guide bushing 79 carried in a lateral extension 81 of the tube 13a. The fork 78 projects through casing extension 81 and is provided with an operating handle 82 whereby the fork 78 can be moved to and from holding engagement with the enlarged end 77 of the surface tension disc assembly.

Upon disassembly of the apparatus for inspection or repair, it is desirable to have means for preventing lowering of the plumb bob 69 into the tank. To prevent unwinding of the reel 27a under the weight of the plumb bob 69 upon removal of cover 17a, a spring urged plunger 55a (Figure 6) is slidably mounted in a boss 56a of the bracket 61. The plunger 55a is urged upwardly the spring 57a, but is normally restrained by a pin 58a in the cover 17a engaging the enlarged lower end 59a of the plunger. Upon removal of the cover so that pin 58a is removed, spring 57a becomes operative to project the upper end of the plunger 55a into the path of the pin 47a on the shaft 28a to prevent turning of the shaft and thereby to prevent unwinding of the tape 26a.

If the weighing beam assembly and the tape is to be removed, the upper portion of the tape 26a may be separated from the lower portion carrying the plumb bob 69 by removing the fastening screws in the fastening connection 86 (Figure 6) when the holding arm 87 (Figures 4, 5 and 6) may be moved into engagement with the lower portion of the tape below the connection 86 to hold this portion in its elevated position.

In operation, to gauge the amount of liquid in the tank, the operator first turns the handle 51a to lower the plumb bob 69 alone until it is in engagement with a suitable bottom gauge surface such as the bottom wall 52a of the tank as shown in dotted lines in Figure 4. The handle 51a is then rotated to place tension on tape 26a until the pointer 41a is opposite the bottom gauge mark BG. A reading on the tape 26a is then taken along the upper edge of the pointer 41a.

After the above reading is taken, the tape 26a is reeled in until the plumb bob 69 is received in its socket in hub 73 of the disc 72 and the plumb bob and disc assembly are subsequently elevated sufficiently to allow the holding fork 78 to be withdrawn so that the surface tension disc 72 can drop with the plumb bob 69. The tape 26a is again unreeled until the surface tension disc 72 engages the liquid. The tape 26a is then reeled in an amount to place a predetermined tension thereon by the engagement of the surface tension disc 72 with the surface of the liquid. By virtue of the slightly cupped construction of the surface tension disc 72, a slight amount of liquid is lifted therewith in addition to the weight of the plumb bob 69 and the tension disc assembly. When the desired tension is placed on the tape, the pointer 41a will be opposite the gauge mark SG or surface gauge, and a reading is again taken on the tape 26a. The difference in this reading and the bottom gauge reading gives the depth of liquid in the tank.

After this operation, the apparatus is checked by suspending both the plumb bob 69 and the surface tension disc assembly in the vapor above the liquid level when the pointer 41a should be opposite the weight control mark WC on the gauge plate 43a if the apparatus is properly adjusted and in proper working order.

The term "gauging position" as employed in the claims means a position of the body attached to the elongated element or tape at which slight movement only or no movement of the body is caused by a substantial change in tension applied to the tape, for example, the position of the body at the surface of the liquid, or the position of the body upon the bottom of the tank or other receptacle, as contradistinguished from other positions at which relatively large movements of the body are produced with no change in tension or only slight changes in tension of the tape.

I claim:

1. In indicating means for gauging liquid storage tanks, an elongated element adapted to extend down into a tank, a body attached to the lower end of the element and adapted to assume a gauging position in the tank, and means for applying a predetermined constant tension to the element while the body remains in a gauging position.

2. In indicating means for gauging liquid storage tanks, an elongated element adapted to extend down into a tank, a body attached to the lower end of the element and adapted to assume a gauging position in the tank, and means for applying a predetermined constant tension to the element while the body remains in gauging position, said means including manually operated reeling means engaging the upper end of the element, a movably mounted member over which the upper portion of the element engages before engaging the reeling means, and means for yieldably urging said member in a direction to tension that portion of the element extending downwardly from said member to said body.

3. In indicating means for gauging liquid storage tanks, an elongated element adapted to extend downardly into the tank, reeling means engaging the upper portion of the element to raise or lower the same, a body of substantial weight attached to the lower end of the element, a member engaging the element adjacent the top of the tank and movable responsive to adjustments in the tensioning of the element, and indicating means associated with said member for indicating the degree to which the element is tensioned for a given gauging position of the body.

4. In indicating means for gauging liquid storage tanks, an elongated element adapted to extend down into the tank, reeling means engaging the upper portion of the element to raise or lower the same, a body having substantial weight attached to the lower end of the element and adapted to rest in a gauging position upon the bottom of the tank, a member engaging the element at the top of the tank and movable responsive to adjustments in the tensioning of the element, and means for indicating the extent to which the element is tensioned for a given position of the body, said means enabling application of a predetermined constant tension to the element while the body is at rest upon the bottom of the tank.

5. In indicating means for use with liquid storage tanks, an elongated element adapted to extend down into the tank, reeling means adjacent the top of the tank to raise or lower the element, a member engaging the element at the top of the tank and movable responsive to adjustments in tensioning of the depending element, a liquid surface gauging body of substantial weight carried by the lower end of the flexible element, and means for indicating the extent to which the element is tensioned, said means enabling tensioning of the element to a predetermined degree which is greater than the weight of the body when completely immersed in liquid of the tank and less than the weight of the body in air.

6. In indicating means for gauging liquid storage tanks, an elongated flexible element adapted to extend down into the tank, means adjacent the top of the tank for reeling the flexible element to raise or lower the same, body means of substantial weight carried by the lower end of the flexible element, said body means being adapted for engagement with the bottom of the tank and also being adapted for positioning in a plane corresponding generally to the surface of liquid in the tank, and means for indicating one predetermined constant tensioning of the elongated element in gauging with the body means upon the bottom of the tank and for indicating another predetermined constant tensioning when disposed in said plane.

7. In indicating means for gauging liquid storage tanks, an elongated flexible element adapted to extend down into the tank, means adjacent the top of the tank for reeling the flexible element to raise or lower the same, a body means of substantial weight carried by the lower end of the flexible element, said body means being adapted to engage the bottom of the tank and also being adapted for positioning in the plane of the surface of liquid in the tank, and means for indicating two different predetermined tensionings of the flexible element in taking gauge readings of said body means upon the bottom of the tank and when disposed in the plane of the surface of liquid in the tank, said last means including a sheave at the top of the tank over which the upper end of the elongated member extends, means for movably mounting said sheave whereby the sheave assumes different positions for different tensioning of the elongated element, and visual indicating means to enable positioning of the sheave in either one of two given positions, one position corresponding to a predetermined tension upon the elongated element when the body means rests upon the bottom of the tank, and the second position corresponding to a tension upon the elongated element which is greater than the weight of the body means when completely immersed, and less than the weight of the body means in air.

ALBERT E. JURS.